United States Patent
Mir et al.

(10) Patent No.: US 9,231,876 B2
(45) Date of Patent: Jan. 5, 2016

(54) USER TRAFFIC ACCOUNTABILITY UNDER CONGESTION IN FLOW-BASED MULTI-LAYER SWITCHES

(75) Inventors: Faisal Ghias Mir, Heidelberg (DE); Marcus Brunner, Leimen (DE); Rolf Winter, Heidelberg (DE); Dirk Kutscher, Heidelberg (DE)

(73) Assignee: NEC EUROPE LTD., Heidelberg (DE)

( * ) Notice: Subject to any disclaimer, the term of this patent is extended or adjusted under 35 U.S.C. 154(b) by 114 days.

(21) Appl. No.: 14/008,689

(22) PCT Filed: Sep. 6, 2011

(86) PCT No.: PCT/EP2011/004471
§ 371 (c)(1),
(2), (4) Date: Dec. 11, 2013

(87) PCT Pub. No.: WO2012/130264
PCT Pub. Date: Oct. 4, 2012

(65) Prior Publication Data
US 2014/0192646 A1    Jul. 10, 2014

(30) Foreign Application Priority Data
Mar. 29, 2011  (EP) .................................. 11002569

(51) Int. Cl.
| H04L 12/813 | (2013.01) |
| H04L 12/26 | (2006.01) |
| H04L 12/801 | (2013.01) |
| H04L 12/851 | (2013.01) |
| H04L 12/835 | (2013.01) |
| H04L 12/803 | (2013.01) |

(52) U.S. Cl.
CPC ............ *H04L 47/20* (2013.01); *H04L 43/0829* (2013.01); *H04L 47/12* (2013.01); *H04L 47/2441* (2013.01); *H04L 47/122* (2013.01); *H04L 47/30* (2013.01)

(58) Field of Classification Search
None
See application file for complete search history.

(56) References Cited

U.S. PATENT DOCUMENTS

| 6,667,985 B1 * | 12/2003 | Drummond-Murray ..... 370/415 |
| 7,050,396 B1 * | 5/2006 | Cohen et al. .................. 370/235 |
| 7,092,357 B1 * | 8/2006 | Ye ................................. 370/230 |
| 7,313,627 B1 * | 12/2007 | Noble ........................... 709/233 |
| 7,646,715 B2 * | 1/2010 | Oueslati et al. .............. 370/234 |
| 2009/0300209 A1 * | 12/2009 | Elzur ............................. 709/234 |
| 2010/0142524 A1 * | 6/2010 | Garofalo et al. .............. 370/389 |

OTHER PUBLICATIONS

International Search Report dated Oct. 31, 2011, corresponding to PCT/EP2011/004471.

(Continued)

*Primary Examiner* — Kerri Rose
(74) *Attorney, Agent, or Firm* — Young & Thompson

(57) ABSTRACT

A method of policing network traffic based on congestion on a flow-based programmable switch, such as an OpenFlow switch is provided. The method polices congestion-causing flows in a network by detecting congestion at a flow-based programmable switch on the network. Once congestion has been detected, the method identifies one or more flows that are causing the congestion at the flow-based programmable switch, and penalizes the flows that were identified as causing congestion. A flow-based programmable switch including a data plane having input ports, output ports, and forwarding rules that map packets received on an input port to an output port based on a packet matching a rule in the forwarding rules is also described.

18 Claims, 3 Drawing Sheets

(56) References Cited

OTHER PUBLICATIONS

M.K. Agarwal, et al.; "Link Utilization based AQM and its Performance"; Global Telecommunications Conference; vol. 2, Nov. 29, 2004; pp. 713-718; XP010757623.

Celio Albuquerque Tatsuya: Fair Queueing with Feedback-Based Policing: Promoting Fairness and Preventing Congestion Collapse in the Internet; Proceedings of the IEEE Conference on Global Communications; Dec. 1999; XP002661753.

Nick McKeown, et al.; "Openflow: Enabling Innovation in Campus Networks"; Mar. 14, 2008; pp. 1-6; XP55002028.

* cited by examiner

USER TRAFFIC ACCOUNTABILITY UNDER CONGESTION IN FLOW-BASED MULTI-LAYER SWITCHES

FIELD OF THE INVENTION

Embodiments of the invention relate to detecting and policing flows that cause congestion in a network using flow-based programmable switches, such as switches implementing the OpenFlow protocol.

BACKGROUND

Congestion-based network traffic policing is a promising network resource control paradigm that accounts for user traffic in the event of network congestion. It has been argued, for example in B. Briscoe, "Flow Rate Fairness: Dismantling a Religion", ACM Computer Communications Review, 37(2), 63-74 (April 2007), that flow rate fairness, which has been used in the past, is not a reasonable mechanism for resource allocation and accountability of network resources. Instead, it is suggested that a cost-based mechanism would provide a better resource allocation paradigm, in which "cost" means the degree to which each user's transfers restrict other transfers, given the available network resources. The metric that has been suggested for measuring this cost is the volume of network congestion caused by each user. A network traffic policing mechanism based on congestion offers a net-neutral way for network operators to manage traffic on their networks.

There have been several proposals for implementing congestion-based network traffic policing. For example, Re-ECN is a proposal that has been made in the Internet Engineering Task Force (IETF) Congestion Exposure (CONEX) Working Group. As will be discussed in greater detail below, Re-ECN, or re-feedback of explicit congestion notification provides a feedback mechanism through which packets expose the congestion that they expect to cause. Unfortunately, implementing Re-ECN would require protocol extensions both at end hosts and at the IP level. In order to deploy such protocol extensions, numerous vendors of network equipment and software would need to support such extensions, which makes wide scale commercial deployment of these technologies unlikely, at least in the near future.

Another congestion-based policing proposal has been put forward by Comcast. This proposal is detailed in IETF RFC 6057: Comcast's Protocol-Agnostic Congestion Management System, which can be found at http://tools.ietf.org/html/rfc6057. The Comcast proposal provides a mechanism for congestion management that is protocol agnostic and that requires no modifications to the communication stack. The system monitors users' network usage, and dynamically decides when congestion has occurred and which user traffic should be throttled. Unfortunately, the system proposed by Comcast seems to have a number of drawbacks, as will be discussed in greater detail below. First, while it is mentioned that the system may be applicable to other types of networks, as described, the system is relatively specific to the broadband service architecture used by Comcast. Also, the Comcast proposal attempts to determine congestion based on a volume at a customer or line level, rather than looking at the "cost"—i.e. congestion volume—on a flow level.

SUMMARY

Based on the above, it is an object of embodiments of the invention to provide a system for policing network traffic based on congestion at the flow level, that can be applied to widely-used network architectures, and that requires no modifications to commonly used network communication protocols.

This is achieved in accordance with embodiments of the invention, by providing a method of policing network traffic based on congestion on a flow-based programmable switch, such as an OpenFlow switch. The method polices congestion-causing flows in a network by detecting congestion at a flow-based programmable switch on the network. Once congestion has been detected, the method identifies one or more flows that are causing the congestion at the flow-based programmable switch, and penalizes the flow that was identified as causing congestion.

Notably, embodiments of the invention work in the context of flow-based programmable switches, which form a "software defined network". In contrast to conventional networks, software defined networks (SDN's), such as OpenFlow, along with virtualization technologies on switches, offer immense flexibility both in terms of defining and monitoring the network state. For example, within the OpenFlow paradigm, the network is completely controlled by a controller entity that communicates with network elements that also understand the OpenFlow protocol. The network traffic is controlled by a set of programmable traffic forwarding rules, which map incoming packets on a switch port to the outgoing switch port within an instance of a switch (either physical or virtual). Thus, the OpenFlow protocol has built-in functionality for forwarding traffic. It will be understood that as used herein, a "flow" may refer to the stream of packets that are forwarded by a single rule in the set of programmable traffic forwarding rules. Thus, "flow" and "rule" are sometimes used to refer to the same granularity of monitoring and forwarding of packets.

These capabilities of a flow-based programmable switch are used in accordance with embodiments of the present invention to provide congestion-based policing of network traffic without altering widely used network architectures or protocols. While some embodiments of the invention are described using OpenFlow switches as examples of flow-based programmable switches, it will be understood that the methods of the invention may be used with any flow-based programmable switch.

At any given time, the controller entity in an OpenFlow network has a detailed view of the network state, which is built by exchanging control messages between the controller and various network elements. Moreover, the OpenFlow protocol also has build-in support for resource usage statistics that a controller may request of any network element. The granularity of these resource usage statistics can range from statistics on a particular flow to statistics on a port of a switch. Other flow-based programmable switches may have similar capabilities for monitoring resource usage statistics, or may be configured by programming them to monitor such statistics at multiple levels of granularity. Thus, in some embodiments, detecting congestion is achieved by monitoring a statistic of a port of the flow-based programmable switch, while in other embodiments a flow on the flow-based programmable switch is monitored.

The statistics that are being monitored may also vary. Thus, in some embodiments, a drop count, indicating a number of packets dropped on a port or flow, may be monitored to detect congestion. In some embodiments, a mark count, which, as described below, is related to a length of a queue at an output of a port or flow may be used to detect congestion. Similarly, in some embodiments, a statistic based on a count of packets that are marked with a congestion mark, indicating that the packets have been subject to congestion on the network may be used to detect congestion. These statistics may either be used individually, or in combination with each other or with other statistics collected by the switch.

In some embodiments one or more of these statistics may be monitored over a period of time that may be predetermined and/or configurable. This permits averages of the statistics over time to be computed and used for detecting congestion. To implement collection of these statistics, in some embodiments the drop count and/or the mark count may be monitored using a counter added to a flow table entry (e.g., a rule) in the flow-based programmable switch. In some embodiments this counter may be reset to zero for flow table entries that forward traffic to a port on which congestion has been detected.

In some embodiments, congestion may be detected by monitoring a statistic related to a time between handling a packet on the flow-based programmable switch, and handling a return packet associated with that packet (such as an ACK) on the flow-based programmable switch. When the time between handling the packet and handling the return packet increases, this may be a good indicator that congestion is occurring.

Once it is determined that congestion is occurring, a flow, or a set of flows that is causing congestion is identified. In some embodiments, this may be done by re-routing packets that have been determined to be subject to congestion for further analysis. In some embodiments, this can be done by mirroring the packets that have been determined to be subject to congestion. For example, packets from a congested port may be mirrored to another port that routes those packets to a module that determines which flows on the port are causing the congestion. Because this mirroring may preserve the timing information on the packets to at least some degree, in some embodiments this further analysis may include using the timing information of the packets to determine which of the flows represented by the packets is causing congestion. For example, a module to which the packets are mirrored could apply a known token bucket algorithm to each of the flows represented by the packets that it is sent to determine which of the flows are most responsible for the congestion.

In some embodiments, instead of re-routing packets, the flows that are causing congestion (i.e., those that are most responsible for the congestion, and should be policed) are identified by correlating port statistics and flow statistics. Generally, statistics such as a packet count from all of the flows on a particular congested port can be monitored over a period of time to determine which flows are using the largest share of the port during congestion.

Once the flow or set of flows that is causing congestion has been identified, these flows can be penalized. In some embodiments, this may be done by re-routing the flow that was identified as causing congestion. In some embodiments, this can be done by increasing a probability of dropping packets of the flow that was identified as causing congestion. In some embodiments, this can be done by charging a premium tariff to the owner of the flow that was identified as causing congestion. Combinations of these may also be used to police congestion-causing flows. In some embodiments, congestion-causing flows can be policed by load balancing traffic across multiple flow-based programmable switches.

In some embodiments in accordance with the invention, all of these functions are performed within a single flow-based programmable switch. In other embodiments, one or more of detecting congestion, identifying a flow that is causing congestion, and penalizing the flow that was identified as causing congestion are implemented at least in part outside of the flow-based programmable switch. For example, some of the modules involved in performing these tasks may be separate servers or specialized systems that monitor statistics from numerous such flow-based programmable switches.

In some embodiments in accordance with the invention, a flow-based programmable switch is provided. The flow-based programmable switch includes a data plane having input ports, output ports, and forwarding rules that map packets received on an input port to an output port based on a packet matching a rule in the forwarding rules. The flow-based programmable switch further includes a congestion detection module that receives statistics from the data plane and is configured to detect congestion at the flow-based programmable switch, a traffic/flow extractor module that receives statistics and/or packets from the data plane and is configured to identify a flow that is causing congestion at the flow-based programmable switch when congestion has been detected, and a policing module that receives information on the flow that is causing congestion from the traffic/flow extractor module and is configured to penalize the flow that has been identified as causing congestion at the flow-based programmable switch. In some embodiments, the flow-based programmable switch is configured to use the OpenFlow protocol.

BRIEF DESCRIPTION OF THE DRAWINGS

In the drawings, like reference characters generally refer to the same parts throughout the different views. The drawings are not necessarily to scale, emphasis instead generally being placed upon illustrating the principles of the invention. In the following description, various embodiments of the invention are described with reference to the following drawings, in which.

DESCRIPTION

Congestion-based policing of network traffic provides a useful mechanism for allocating and accounting for network resources in a manner that is based on "cost-fairness". While there have been previous attempts to provide methods and systems for congestion-based policing of network traffic, these previous attempts have some issues that could prevent them from being widely used.

Figure 1:
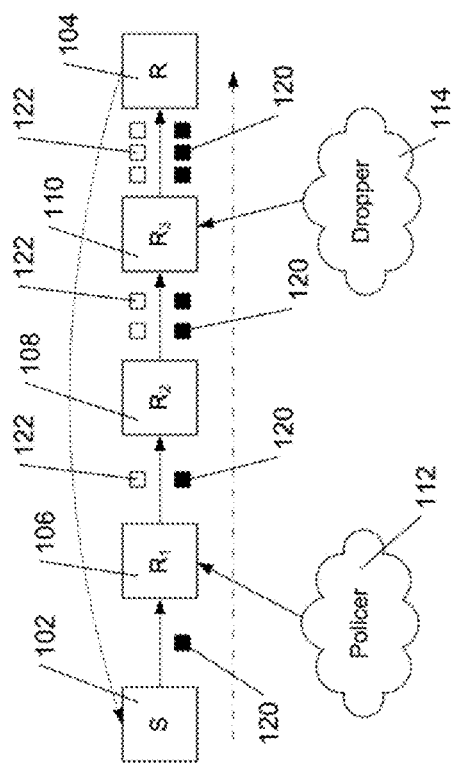
FIG. 1 shows an overview of a previously known Re-ECN framework.

FIG. 1 shows an overview of the Re-ECN (which stands for re-feedback of explicit congestion notification) framework, and its functional entities. Re-ECN is described, for example, in B. Briscoe, A. Jacquet, C. Di Cairano-Gilfedder, A. Salvatori, A. Soppera, and M. Koyabe, "Policing congestion response in an internetwork using re-feedback", Proc. ACM SIGCOMM'05, CCR, 35(4):277-288, August 2005.

As shown in FIG. 1, a sender 102 (e.g., a TCP sender) and a receiver 104 (e.g., a TCP receiver) communicate over a path that includes routers 106, 108, and 110, as well as a policer 112 and a dropper 114. For the sender 102 and the receiver 104, the path can exhibit different characteristics with respect to delay, packet loss or "Congestion Experienced" (CE)

marking rate due to transient or persistent congestion. Routers, such as the routers 106, 108, and 110, implementing active queue management (AQM) mechanisms probabilistically set the explicit congestion notification (ECN) bits (using random early detection (RED)) in the IP packets, such as packets 122, when they detect persistent congestion. The receiver 104, upon receiving congestion marked packets, such as the packets 122, notifies the sender about the current congestion level through its transport protocol's feedback mechanism, e.g., using TCP header fields. The sender 102 then reacts to received congestion indications by adapting the sending rate according to the congestion control mechanisms of the specific transport protocol, and by declaring a fraction of the IP traffic sent on this connection as its congestion contribution to the network, by placing re-echo information in packets sent, such as packets 120, with the goal of balancing the "negative" congestion contribution, as reported by congestion feedback, with the declared "positive" congestion contribution, as declared by the sender.

Thus, the basic principle of Re-ECN is to re-insert information on the experienced congestion back into the network. This allows the ingress policer 112 to decide what a user is entitled to in terms of allowed congestion according to network policies. The dropper 114 validates the declared congestion values, dropping packets in flows that persistently declare negative downstream congestion (i.e., that under-declare their congestion contribution).

The Re-ECN mechanism, as described, has some difficulties. First, unlike embodiments of the present invention, the Re-ECN mechanism requires changes both at the end hosts and in the IP layer for policing user traffic based on congestion. Additionally, since the congestion information is exposed on the path, Re-ECN requires functional entities, such as the policer 112 and the dropper 114, deployed in the network for correct accounting of user traffic in congestion events.

Figure 2:
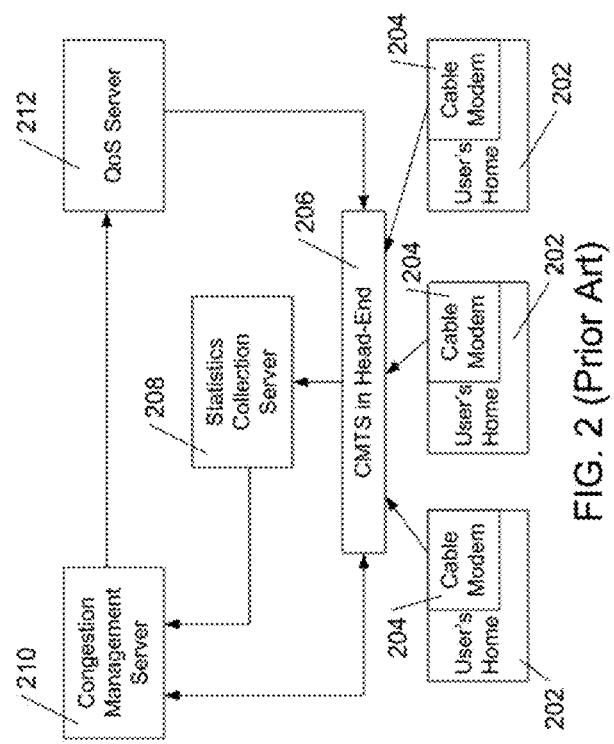
FIG. 2 shows an overview of a previously known architecture for a congestion management system for use with cable modems.

Another proposal for congestion management, proposed by Comcast is shown in FIG. 2. This proposal is described in greater detail in IETF RFC 6057: Comcast's Protocol-Agnostic Congestion Management System, which can be found at http://tools.ietf.org/html/rfc6057. The system shown in FIG. 2 is intended to monitor users' network usage, and to let the system dynamically decide when congestion has occurred, and later which user traffic should be throttled.

As shown in FIG. 2, internet traffic from a user's home 202 is transferred through the user's cable modem 204 to a cable modem termination system (CMTS) 206 at a cable head-end. The CMTS 206 may handle traffic from hundreds of cable modems, and periodically sends statistics on traffic to a statistics collection server 208, which uses IP detail records (IPDR) to collect statistics, and relays selected statistics to a congestion management server 210. The CMTS 206 may also respond to periodic requests from the congestion management server 210 to check the CMTS port utilization levels. The congestion management server 210 collects information for determining when a "near congestion state" may exist from the statistics collection server 208 and from the CMTS 206, and then instructs a quality of service (QoS) server 212 to change the quality of service for devices in order to enforce network congestion policies. The QoS server 212 uses PacketCable Multimedia (PCMM) to set QoS gates on the CMTS 206 by sending messages back to the CMTS 206 to change connection traffic from a "Priority Best Effort" (PBE) quality of service to a "Best Effort" (BE) quality of service in order to throttle the traffic, or from a BE to a PBE quality of service. Delays resulting from congestion generally affect BE traffic before affecting PBE traffic.

As can be seen from FIG. 2, the system described by Comcast is tailored to use with cable modems, and with Comcast's particular network architecture, though the descriptions of the Comcast system mention that the their solution is also applicable to other types of networks. Also, the system shown in FIG. 2 is a simplification of the actual network, which may include redundancies and other complexities that are not necessary to depict the high-level functional design.

The Comcast solution detects congestion based on a "CMTS Port Utilization Threshold", measured from the CMTS 206, which is shared between hundreds of cable modem subscribers. The mechanism is triggered once a CMTS port is in a "Near Congestion State", which occurs when traffic flowing to or from that CMTS port exceeds a specified level for a specified period of time. Thus, the metric for determining congestion is volume of packets passed through a port—which is a poor indication of actual congestion conditions. By contrast, various embodiments of the present invention use better congestion signals, such as packet drops (tail-drop for a port queue), early detection mark/drop mechanisms, queue length, or timing of TCP selective acknowledgements (TCP SACK's) to detect congestion. Embodiments of the invention are principally directed to managing congestion volume—i.e., policing congestion, rather than policing the total volume used by any particular user.

Additionally, in the Comcast solution, once a port is an a "Near Congested State", the fair share of traffic at the bottleneck is determined based on the service purchased by the user ("User Consumption Threshold"). Thus, the granularity of control is on a per user or per line basis. As will be discussed below, embodiments of the present invention are flow-based, and may use flow table statistics in a flow-based switch for determining the fair share under congestion. The granularity for the metric is dynamic, and can vary according to network policies, spanning from a subscriber IP address range to a particular flow—or any other granularity that can be represented in, e.g., the 10-tuple flow attributes used in OpenFlow (see below). These same 10-tuple flow attributes can be used in some embodiments of the invention for monitoring traffic, instead of using Internet Protocol Detailed Records (IPDR) as is done in the Comcast system, as shown in FIG. 2.

The Comcast solution's ties to Comcast's particular cable modem-based network, as well as its volume-based metric for determining congestion and its per user or per line granularity for control make the Comcast solution, while appropriate for Comcast's needs, more difficult to use as a general system for congestion-based policing of network traffic.

Figure 3:
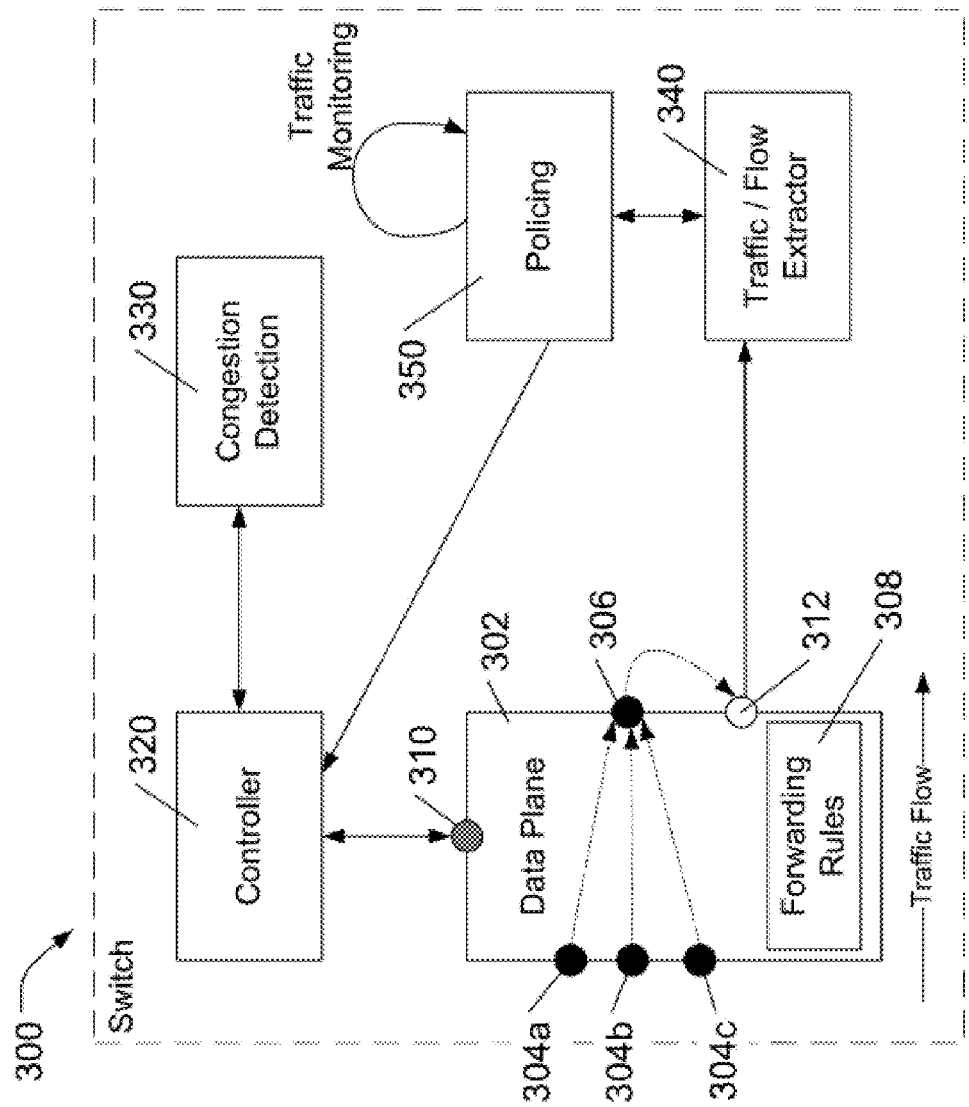
FIG. 3 shows congestion-based policing framework for a flow-based programmable switch in accordance with an embodiment of the invention.

Referring now to FIG. 3, an embodiment of a switch in accordance with the invention is described. The switch 300 in this example embodiment is an OpenFlow switch, such as the NEC IP8800, produced by NEC Corporation, of Tokyo, Japan, but it will be understood that other flow-based programmable switches could be used.

The switch 300 includes a data plane 302 with ports 304a-304c on which incoming data arrives, port 306 through which outgoing traffic is routed (it will be understood that there are several such ports that are not shown—in the example shown in FIG. 3, only a congested outbound port 306 is shown), forwarding rules 308, which determine how packets will be routed, control port 310, over which the controller 320 sends control signals to the data plane 302 and receives statistics from the data plane 302, and mirror port 312, which is used for re-directing traffic for analysis during congestion.

The data plane 302 determines what to do with packets arriving on its inbound ports. Because the switch 300 is a flow-based programmable switch, the data plane 302 is able to determine how to forward packets based on the flows to which the packets belong, as well as based on other attributes of the packets using the forwarding rules 308, which can be reconfigured or reprogrammed. In OpenFlow switches, for example, the forwarding rules 308 are applied based on matching incoming packets against 10-tuples, which include fields for an in-port, a virtual local area network (VLAN) ID, Ethernet-related fields for source address (SA), destination address (DA), and type of the message carried in the payload, IP-related fields for source address (IP SA), destination address (IP DA) and protocol, and TCP-related fields for source port (Src) and destination port (Dst). Any of these fields in the 10-touple can matched by a wildcard. This allows, for example, for a rule to be applied to all traffic on a particular VLAN by specifying only the VLAN ID, while using wildcards for the other fields of the 10-touple, or to be applied at any other granularity that can be specified using the fields of the 10-touple. Once the 10-touple for a rule is matched, the forwarding rule associated with that 10-touple is applied to determine how the matching packet should be processed. Additionally, for each rule in the forwarding rules 308, a set of statistics may be kept. As will be seen, in accordance with embodiments of the invention, these statistics can be used to determine whether congestion is occurring, and which flows are causing the congestion.

The switch 300 also includes a controller 320, which receives statistics from the data plane 302, and sends control signals to the data plane 302. The controller 320 may forward the statistics (e.g., port statistics) of the data plane 302 to a congestion detection module 330 for analysis, to determine whether congestion is occurring. The nature of this analysis is described in greater detail below.

The switch 300 further includes a traffic/flow extraction module 340, which receives mirrored packets from the mirror port 312 of the data plane 302 during congestion events, and (as will be detailed below) uses these packets to determine which flows are causing the congestion. Information on the flows that are causing the congestion, as well as (optionally) the packets are sent to a policing module 350, which monitors traffic from these flows, and implements network policy during congestion by sending policing enforcement messages to the controller 320, which may then send control messages to the data plane 302 to, e.g., penalize the flows that are causing the congestion. This can be done, for example, by re-routing the flows, or by causing them to drop packets with an increased probability.

It should be noted that the embodiment of the switch 300 shown in FIG. 3 is just one possible configuration that can be used for congestion-based policing in accordance with embodiments of the invention. In the case of the switch 300 shown in FIG. 3, for example, the assumption is made that re-direction or mirroring of packets during congestion is used to determine which flows are causing the congestion, due to the presence, e.g., of mirror port 312. As will be explained in greater detail below, there are other ways of making this determination, which would lead to a different configuration for the switch 300. For example, if determining which of the flows is causing the congestion is handled by correlating port statistics and flow statistics, then this correlation does not need to mirror or re-direct traffic, so mirror port 312 is not needed, and the module 340 that determines which flows are causing the congestion can be connected to the controller 320 or combined with the congestion detection module 330. Similarly, in such a system, the policing module 350 could be connected with or combined into the controller 320.

It will be understood that the various modules related to congestion policing, such as the congestion detection module 330, the traffic/flow extraction module 340, and the policing module 350, as well as the controller 320 may be programmed into the switch 300, or may be implemented in modules or on servers outside of the switch 300. It is also possible that one or more of these modules may communicate with several physical or virtual switches or data planes. In some embodiments, for example, a single external congestion detection module on an external server may receive information from multiple switches on the network.

A flow-based programmable switch, such as is shown in FIG. 3, generally has built-in support for querying network state in terms of usage statistics at varying granularities—e.g. flow-based statistics, port-based statistics, etc. In accordance with embodiments of the invention, these statistics may offer enough insights into network state to build a congestion-based policing mechanism. Thus, in accordance with embodiments of the invention, a programmable switch can be programmed or configured as seen in the example in FIG. 3, to include modules that detect congestion on flow-based programmable switches (or on the ports or flows of these switches), identify the subset of traffic (e.g., the flows) that are contributing to or causing the congestion, and to police the identified subset of traffic that is causing congestion.

Figure 4:
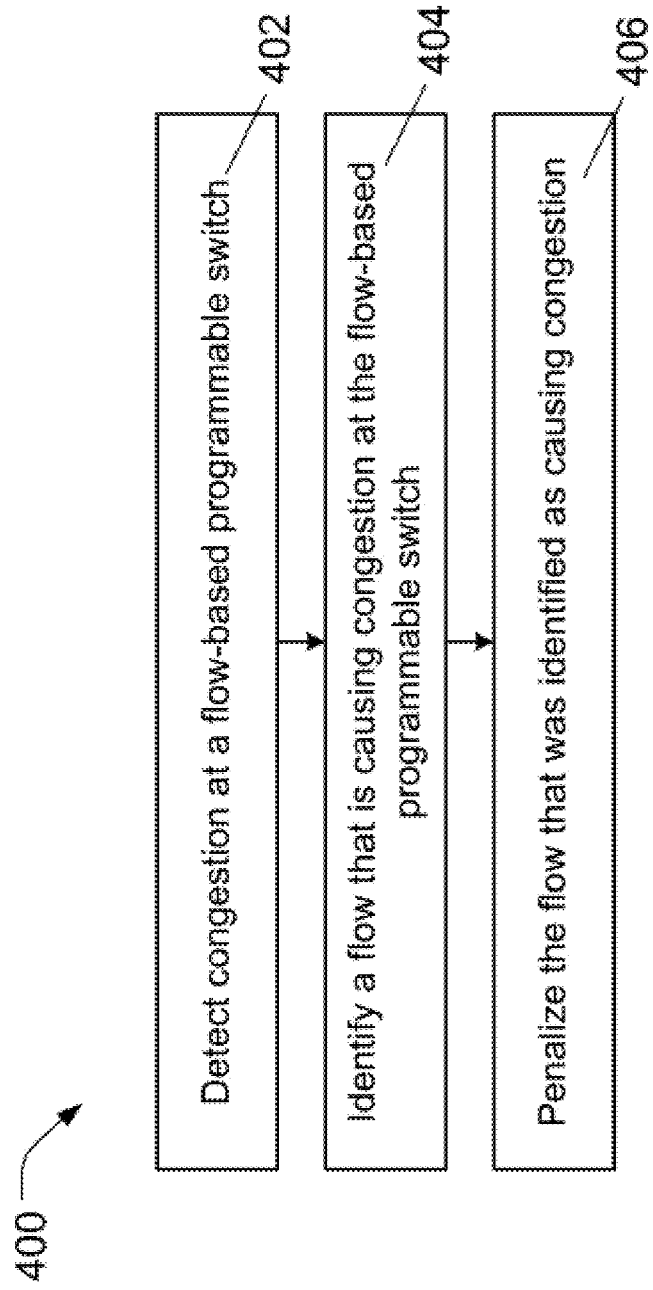
FIG. 4 shows an outline of steps in a method for congestion-based policing on a flow-based programmable switch in accordance with an embodiment of the invention.

The basic structure of a method of policing congestion-causing flows in a network in accordance with embodiments of the invention is shown in FIG. 4. As shown, at a high level, the method 400 includes a step 402 of detecting congestion at a flow-based programmable switch on the network, a step 404 of identifying a flow that is causing congestion at the flow-based programmable switch, and a step 406 of penalizing the flow that was identified as causing congestion. Each of these steps will be discussed in greater detail below.

With respect to the step 402, of detecting congestion at a flow-based programmable switch on the network, it may be useful to establish the notion of congestion in the switch, and the granularity at which congestion should be established. There are a number of possibilities for this that can be used in a flow-based programmable switch. Since congestion is of principle concern for the data plane, some embodiments of the invention may use port statistics from the data plane of a flow-based programmable switch to detect congestion on a single switch port. Alternatively, other granularities can be used, such as flow-based statistics to detect that a particular flow is experiencing congestion. For example, in an Open-Flow-based switch, the statistics for each of the forwarding rules could be used to determine whether packets being handled by a particular rule (which can be identified with a "flow") are experiencing congestion.

Whichever granularity is selected for detecting congestion, there are numerous ways that can be used to detect congestion. One mechanism is a drop count. This mechanism involves monitoring (e.g., by polling) port or flow statistics (i.e., rule statistics in an OpenFlow switch) at pre-defined time intervals, to determine the number of packet drops. From successive readings, an average drop rate can be determined. If drops are persistent in successive time intervals, the average drop rate may be compared against a pre-defined threshold to establish that congestion is occurring. Assuming that the statistics are being examined at a port level, then congestion will be determined to be occurring when the average drop rate of a particular port exceeds the threshold. If statistics are being examined at a flow or rule level, then congestion will be determined to be occurring when the average drop rate for a particular flow or rule exceeds a predetermined threshold.

It should be noted that for OpenFlow switches and possibly other flow-based programmable switches, the flow table or rules may need to be extended with drop counts for specific rules. Additionally the OpenFlow switch may need to be modified to read out the drop statistics per forwarding rule. Because such switches are programmable, these modifications can be made to the switches without requiring that the modifications be widely adopted by vendors, and without requiring the modification of any standard communication protocol.

Other counts can also be used for detecting congestion. For example, if packets in the network are congestion-marked—i.e., they are marked when they encounter congestion, then a count of such congestion-marked packets through a port or in a flow/rule could be used to detect congestion.

Alternatively, instead of counting packet drops, a statistic related to early warnings, similar to ECN marking with RED could be used. ECN (explicit congestion notification) when used with RED (random early detection) determines based on the queue length at a switch or router a probability for congestion marking a packet. In accordance with an embodiment of the invention, instead of marking a packet based on RED, an early warning mark counter per port or queue (or per flow/rule) could be increased, based (perhaps in a probabilistic manner, as is used in RED) on a packet queue length. This early warning mark counter may then be used to detect congestion (or to provide an early warning of congestion) when the mark count remains high over successive time periods, and exceeds a predetermined threshold, similar to the handling of the drop counter statistics discussed above.

It should be noted that based on these statistics, the method can differentiate between early warnings and drop operations, and could help in identifying users that are not throttling under congestion. Additionally, mark counting (i.e., counting the early warning marks as described above) could be used to detect possible congestion earlier, since a packet does not need to be dropped to influence congestion-based policing—the early warning marks may influence policing before packet drops occur.

As above with drop counts, for OpenFlow switches, and possibly other flow-based programmable switches, a counter may need to be added to the flow table entries (i.e., the forwarding rules) in the switch to keep track of mark counts. Additionally, the switch may need to be modified to read out this statistic. In some embodiments, once congestion has been detected, the mark and/or drop counts for a port or rule on which the congestion has been detected may be reset to zero.

One further way of detecting congestion that could be used in accordance with embodiments of the invention is to examine the bi-directional flow of packets. For example, there may be ACK packets that return through the network for packets sent across the network. When a packet is handled, a record of the packet can be kept. When a return packet, such as an ACK, is received, it can be checked to see if it can be associated with the earlier-sent packet. The time between handling a packet on the switch and handling a return packet associated with that packet may be used as an indicator of congestion. For example, if this time is generally increasing on a particular flow, the flow may be affected by congestion on the network. Because this method of detecting congestion keeps a considerable amount of state information, e.g., the information on the packets handled so that they can be associated with return packets, it may be desirable to use this method on a subset of flows.

Once congestion has been detected, then at step 404 the method identifies a flow or a set of flows that are causing the congestion. This should be done even if congestion is being detected at the flow level, since the flows that are affected by the congestion—leading to the congestion being detected—are not necessarily the same flows that are causing the congestion. In accordance with various embodiments of the invention, there are two main approaches that may be used for determining a flow or set of flows that are causing congestion.

In the first approach, as shown and discussed above with reference to FIG. 3, traffic from a congested port or flow can be re-routed. The port mirroring features of programmable switches can be used to redirect traffic from a congested port or flow to a spare port on the switch (which is used as a "mirror" port), with the aim of identifying the share of the congestion caused by the flows of a congested port. On an OpenFlow switch, for example, traffic from a congested port can be mapped to the mirror port for further analysis, primarily determining which traffic and/or flows are consuming high bandwidth, and are therefore responsible for causing the congestion. Generally, the mirroring can be done at the same level of granularity as congestion detection, so mirroring can take place on a flow/rule level, on a port level, or at any level that can be re-directed by the switch. Alternatively, when congestion has been detected on a flow level, all of the traffic from the port that included the flow could be mirrored or re-directed, so that other flows on the same port can be examined.

Using this port mirroring approach, a traffic/flow extractor module (such as the traffic/flow extractor module 340 shown in FIG. 3) may be used to monitor the mirrored traffic. A RED module may also be used to mark congestion traffic proportional to the link usage. Advantageously, time information of the mirrored packets may still be usable to a certain degree, when the packets are not dropped on the mirror port (which can happen, since mirroring traffic from a congested port to a mirror port may also cause congestion, potentially leading to dropped packets on the mirror port). This permits users sending large bursts to be classified as contributing to congestion based on more than just the rate of a flow. For example, since timing information is available, a token bucket algorithm can be run against the packet trace taking the timing of packets into account when classifying the contribution to bursts of traffic. Such a token bucket algorithm works by adding tokens to a virtual "bucket" at regular time intervals for a flow, and removing tokens as packets come in from the flow. Packets that are coming in when there are no tokens indicate a burst of traffic that may be causing congestion.

When several congested ports or flows have been detected, the source port or flow that is being mirrored can be changed through re-configuration of the flow table or rules by the switch controller. Each of the congested ports can be mirrored for short time intervals, for example in a round-robin fashion. This permits each such congested port or flow to be mirrored and analyzed for a configurable time before the next port or flow is mirrored.

A second way of identifying a flow or a set of flows that are causing the congestion in accordance with embodiments of the invention involves correlating port statistics with the flow table statistics to identify congestion-causing flows. This correlation can be done at the switch controller, and avoids port mirroring or the need for a spare port on the switch. Flow-based programmable switches may record a variety of statistics applicable to ports and to flows. For example, each flow entry in the flow table of an OpenFlow switch records the number of passed octets/packets, and each port has an aggregated set of statistics, such as packets dropped, received, etc. for the traffic handled at a port. Thus, there is a difference in granularity of information.

This information can be used to determine high bandwidth-consuming users/flows during congestion conditions by calculating the share of each flow at a bottleneck, such as a port, during the time that it is under congestion. This can be calculated as a fraction for each flows in a set of flows that use a congested port. Note that for congestion-based policing, volume of traffic at times when there is no congestion is generally not needed, so these calculations only need to be done during periods of congestion.

To determine the share of each flow at a port, first the set of all flow table entries or rules having an action to send packets to a particular port is determined. From flows/rules within this set, flow statistics are read twice with a configurable time interval between the readings. The statistics of the two readings are subtracted in order to determine values of the statistics over the time interval. For example, the number of packets attributed to each flow that uses the port during the interval could be calculated in this manner. This information may then be used to calculate the fraction of the resource (e.g. the port) that is used by each flow during congestion conditions. Those flows that are using a high fraction of the resource during congestion are determined to be primarily responsible for the congestion, and are subject to being policed.

It should be noted that a "high" fraction of the monitored resource, such as a port during congestion conditions may be determined in absolute or in relative terms. For example, in relative terms, all flows that use more than a configurable percentage of the "fair" rate (i.e., the rate of traffic for a flow, if all flows on a port were given access to an equal share of the port) may be subject to policing. An absolute measure, for example, might be that all flows using more than a predetermined amount of bandwidth during a congestion condition are subject to policing.

It should also be noted that in accordance with some embodiments of the invention, instead of reading the statistics twice over an interval, the statistics for all flows that send to a particular port could be reset (e.g., set to zero) when the port is determined to be congested. After a configurable time period, the statistics could be read. By resetting the statistics in this manner, only one read of the statistics is needed, and no calculation (i.e., subtraction of the statistics) needs to be done. This may help prevent the controller from being overloaded through reading a potentially large number of flow and port statistics twice. To reset the statistics in this manner in an OpenFlow switch, a new OpenFlow extension could be used to reset the statistics when congestion is detected.

Finally, in step 406, flows that were determined to be causing the congestion in step 404 are penalized. This policing function generally defines the penalizing behavior in terms of throttling (e.g., providing a lower service rate) the congestion-causing flows or users. There are several ways in which this can be done in accordance with embodiments of the invention.

In some embodiments, traffic from congestion causing flows can be re-routed. This is likely to cause a drop in service rate to the congestion causing flows, since they were likely routed in a way intended to provide a high service rate. By re-routing them through non-congested ports, these flows will probably face longer routes through the network, and decreased service rates. In some embodiments, policing information may be correlated across numerous switches to re-route traffic from congestion-causing flows, or to attempt to load balance traffic across multiple flow-based programmable switches by re-routing traffic from congestion-causing flows.

In some embodiments, the flows that are causing congestion may be penalized by increasing the probability that their packets will be dropped due to congestion. In extreme cases, the rules that define these flows can simply cause their packets to be dropped until the congestion condition has cleared. In some embodiments, owners of flows that are identified as causing congestion may be charged a premium tariff for their network usage.

Embodiments of the invention may achieve a less congested network with reduction of heavy user traffic in a net-neutral manner. This is achieved without requiring modifications to existing communication standards. Additionally, the mechanism is dynamic, such that it is only applied during congestion. Thus, the method is based on congestion volume, rather than volume, which permits "well behaved" users to continue to consume large amounts of bandwidth in low-load (i.e., non-congested) situations. Because embodiments of the present invention generally do not operate on the data path, as would be done, e.g., in Re-ECN, embodiments of the present invention may be less exact in detecting congestion and identifying congestion-causing flows. The methods are, however, sufficiently exact to gain many or even substantially all of the benefits of congestion-based policing of network traffic.

While the invention has been particularly shown and described with reference to specific embodiments, it should be understood by those skilled in the art that various changes in form and detail may be made therein without departing from the spirit and scope of the invention as defined by the appended claims. The scope of the invention is thus indicated by the appended claims and all changes which come within the meaning and range of equivalency of the claims are therefore intended to be embraced.

What is claimed is:

1. A method of policing congestion-causing flows in a network, comprising:
    detecting congestion at a flow-based programmable switch on the network;
    identifying a flow that is causing congestion at the flow-based programmable switch, wherein said identifying comprises re-routing packets that have been determined to be subject to congestion for further analysis by mirroring the packets that have been determined to be subject to congestion; and
    penalizing the flow that was identified as causing congestion.

2. The method according to claim 1, wherein the flow-based programmable switch is configured to use the OpenFlow protocol.

3. The method according to claim 1, wherein detecting congestion comprises monitoring a statistic of a port of the flow-based programmable switch.

4. The method according to claim 1, wherein detecting congestion comprises monitoring a statistic of a flow on the flow-based programmable switch.

5. The method according to claim 1, wherein detecting congestion comprises monitoring a statistic based on a drop count, indicating a number of packets dropped.

6. The method according to claim 1, wherein detecting congestion comprises monitoring a statistic based on a mark count, related to a packet queue length.

7. The method according to claim 1, wherein detecting congestion comprises monitoring a statistic based on a count of packets that are marked with a congestion mark, indicating that the packets have been subject to congestion on the network.

8. The method according to claim 5 wherein the statistic is monitored over a period of time.

9. The method according to claim 5, wherein the statistic based on the drop count and/or the mark count is monitored using a counter added to a flow table entry in the flow-based programmable switch.

10. The method according to claim 9, wherein the counter is reset to zero for flow table entries that forward traffic to a port on which congestion has been detected.

11. The method according to claim 1, wherein detecting congestion comprises monitoring a statistic related to a time between handling a packet on the flow-based programmable switch, and handling a return packet associated with the packet on the flow-based programmable switch.

12. The method according to claim 1, wherein further analysis of the packets that have been determined to be subject to congestion comprises using timing information of the packets to determine which of the flows represented by the packets is causing congestion.

13. The method according to claim 1, wherein identifying a flow that is causing congestion comprises correlating port statistics and flow statistics.

14. The method according to claim 1, wherein penalizing the flow that was identified as causing congestion comprises re-routing the flow that was identified as causing congestion, increasing a probability of dropping packets of the flow that was identified as causing congestion, and/or charging a premium tariff to the owner of the flow that was identified as causing congestion.

15. The method according to claim 1, wherein penalizing the flow that was identified as causing congestion comprises load balancing traffic across multiple flow-based programmable switches.

16. The method according to claim 1, wherein one or more of detecting congestion, identifying a flow that is causing congestion, and penalizing the flow that was identified as causing congestion is implemented at least in part outside of the flow-based programmable switch.

17. A flow-based programmable switch including a data plane having input ports, output ports, and forwarding rules that map packets received on an input port to an output port based on a packet matching a rule in the forwarding rules, the flow-based programmable switch further comprising:
a congestion detection module that receives statistics from the data plane, the congestion detection module configured to detect congestion at the flow-based programmable switch;
a traffic/flow extractor module that receives statistics and/or packets from the data plane, the traffic/flow extractor module configured to identify a flow that is causing congestion at the flow-based programmable switch when congestion has been detected by at least re-routing packets that have been determined to be subject to congestion for further analysis by mirroring the packets that have been determined to be subject to congestion; and
a policing module that receives information on the flow that is causing congestion from the traffic/flow extractor module, the policing module configured to penalize the flow that has been identified as causing congestion at the flow-based programmable switch.

18. The flow-based programmable switch of claim 17, wherein the flow-based programmable switch is configured to use the OpenFlow protocol.

* * * * *